United States Patent [19]

Hoenick

[11] 4,435,021
[45] Mar. 6, 1984

[54] VEHICLE BRAKE ACTUATOR AND BRAKING SYSTEM

[75] Inventor: Hermann H. Hoenick, Immendorf, Fed. Rep. of Germany

[73] Assignee: Lucas Industries Limited, Birmingham, England

[21] Appl. No.: 261,183

[22] PCT Filed: Sep. 15, 1980

[86] PCT No.: PCT/GB80/00142

§ 371 Date: May 15, 1981

§ 102(e) Date: May 5, 1981

[87] PCT Pub. No.: WO81/00697

PCT Pub. Date: Mar. 19, 1981

[30] Foreign Application Priority Data

Sep. 15, 1979 [GB] United Kingdom ............... 7932066

[51] Int. Cl.³ .................. B60T 8/04; B60T 13/14; F16D 55/224; F16D 65/16
[52] U.S. Cl. .................... 303/10; 188/72.4; 188/181 A; 303/93; 303/116; 303/117; 303/119; 303/DIG. 1; 303/68
[58] Field of Search ............... 303/113–119, 303/10–12, 15, 16, 17, 93, 100, 112, 20, 61–63, 68–69, DIG. 1; 188/71.1, 72.4, 72.5, 72.1, 181 A, 181 R, 181 C, 181 T, 72.6, 73.31, 106, 358, 359, 370, 366–368, 158, 182; 180/275

[56] References Cited

U.S. PATENT DOCUMENTS 3,507,542  4/1970  Cannella ............... 303/DIG. 1
3,520,575  7/1970  Steigerwald ........... 188/181 A
3,724,914  4/1973  Skoyles .................. 303/116
4,003,013  1/1977  Seilly ..................... 335/220
4,131,325  12/1978 Bayliss ................... 303/93

FOREIGN PATENT DOCUMENTS 1961039  6/1971  Fed. Rep. of Germany ...... 303/119
1780654  2/1973  Fed. Rep. of Germany ...... 303/117
2305775  10/1976 France .
1504873  3/1978  United Kingdom .

OTHER PUBLICATIONS

"Helenoid Actuators: A New Concept in Extremely Fast Acting Solenoids", by A. H. Seilly, SAE Technical Paper Series, 790119, Society of Automotive Engineers, Inc., Warrendale, PA, 1979.

Primary Examiner—Douglas C. Butler
Attorney, Agent, or Firm—Holman & Stern

[57] ABSTRACT

A vehicle brake actuator has a piston (23) within a cylinder (22) for urging friction pad assemblies (19, 20) into braking engagement with a brake disc (21). The actuator incorporates a pressure accumulator (3) and an electrical valve (9) operable to supply pressure from the accumulator to the cylinder in response to the action of a brake pedal or other control device. The actuator may also incorporate a pump (1) for charging the accumulator, together with other equipment such as skid control device. A braking system incorporates one or more of the actuators and device for producing an electrical output in response to displacement of the brake control device for supply to the valve.

18 Claims, 3 Drawing Figures

VEHICLE BRAKE ACTUATOR AND BRAKING SYSTEM

BACKGROUND OF THE INVENTION

1. Field of the Invention

This invention relates to a vehicle brake actuator of the kind which includes pressure-applying means arranged and operable, in use, to urge at least one friction element into braking engagement with a co-operating element fixed to a member to be braked. The invention relates also to a power braking system including one or more brake actuators of the aforesaid kind and in which an electromechanical valve is operable in response to actuation of brake control means, such as a driver-operated pedal, to cause the application of pressure from a pressure accumulator to the or each pressure-applying means in controlled manner.

1. Description of the Prior Art

Conventional power braking systems for vehicles usually incorporate at least two pressure accumulators to provide for effective fail-safe operation, together with a pump for charging the accumulators, a fluid reservoir for containing a supply of operating fluid, a control valve for controlling the supply of said fluid to the pressure-applying means of one or mre brake actuators, and a control unit for actuating the control valve in response to the operation of brake control means to supply actuating pressure from the reservoir to the pressure-applying means. The aforesaid items of equipment are habitually located on the vehicle body, usually in the engine compartment, and consequently require extended and often tortuous runs of fluid conduits to supply the brake actuators at the vehicle wheels, necessitating involved installation procedures.

BRIEF SUMMARY OF THE INVENTION

An object of the invention is to provide a brake actuator of the aforesaid kind, and particularly a disc brake caliper, which enables a compact vehicle power braking system to be produced requiring a minimum of space within the engine compartment and which facilitates the installation of such a system in a vehicle.

According to the invention, a vehicle actuator of the aforesaid kind embodies a pressure accumulator and electrical valve means operable to supply pressure, in use, from the accumulator to the pressue-applying means in response to the actuation of brake control means.

The actuator may also embody a pump for charging the accumulator. The pump and drive means therefor may conveniently be positioned inwardly of the pressure-applying means. In a typical practical arrangement, the pressure-applying means has a piston of hollow cylindrical form and at least the drive means is then preferably housed within the piston, thereby making use of space which is usually wasted in a conventional brake actuator.

Preferably, the actuator also embodies a reservoir for brake fluid and this may be positioned radially outwardly of the pump, conveniently being of annular form and at least partially surrounding the pump. The actuator may also have a control unit for the valve means embodied therein.

One especially advantageous form of the actuator embodies means for detecting an incipient skid condition of the braked wheel and operating in conjunction with the control unit to actuate the valve means in a manner such as to correct the skid, usually by causing a reduction in the braking force applied to the wheel until the skid condition has been corrected. When the actuator is in the form of a disc brake caliper, the skid detecting means may conveniently be an inductive or other similar sensor carried by the caliper body and cooperating with a toothed metal formation carried by a brake disc to produce a signal representative of the angular speed of the disc, and thus of a wheel being braked, said signal being fed to the control unit.

DESCRIPTION OF THE DRAWINGS

The invention will now be described, by way of example, with reference to the accompanying drawings in which.

DETAILED DESCRIPTION

Figure 1:
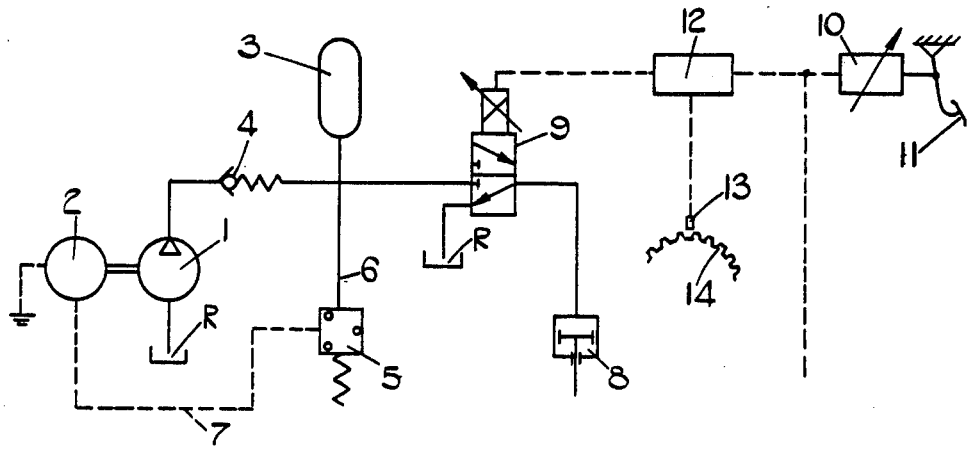
FIG. 1 is a diagrammatic representation of a power braking system suitable for use in a vehicle.

Referring to FIG. 1, the braking system shown therein includes a pump 1 driven by an electric motor 2 to charge a pressure accumulator 3 from a fluid reservoir R via a non-return valve 4. The motor is controlled by a pressure-sensitive switch 5, having a pressure connection 6 to the accumulator and an electrical connection 7 to the motor, so as to maintain the storage pressure of the accumulator within a predetermind range.

The supply of pressure from the accumulator 3 to a brake actuator 8, such as a disc brake caliper for example, is controlled by an electro-mechanical servo valve 9 in response to a transducer 10 mechanically connected to a driver-operated brake pedal 11 and producing an electrical output which varies as a function of pedal displacement and is fed to an electronic control unit 12 electrically connected to the servo valve 9. The pedal is arranged to operate against the resistance of a feel spring (not shown) to simulate the compliance of a pedal actuating a master cylinder.

The system also includes a wheel speed detector in the form of a sensor 13, normally an inductive device, co-operating with a toothed rotor 14 rotatable with the wheel being braked and conveniently secured to a brake disc, in the case of a disc brake. The output from the sensor 13 is fed to the control unit 12.

The servo valve 9 is shown in a position in which the output from the accumulator is blocked and the brake 8 is inoperative, being connected to the reservoir R. Displacement of the brake pedal 11 produces an output from the transducer 10, causing the control unit 12 to produce a corresponding output which is fed to the servo valve 9 causing the valve to admit fluid from the accumulator into the brake actuator to produce a braking effect at the vehicle wheel corresponding to the degree of pedal displacement. When the fluid pressure within the actuator 8 balances the electromagnetic force actuating the servo valve, the valve operates to isolate the actuator from the accumulator to maintain the brake in its operative condition as long as the brake pedal remains displaced. When the brake pedal is released, the output from the transducer 10 ceases, thereby removing the electromagnetic force from the servo valve, enabling the latter to return to its position as shown in FIG. 1, and the pressure in the brake actuator is then allowed to decay to the reservoir, thereby releasing the brake.

If during braking, the control unit detects that the wheel speed as sensed by the sensor 13 is decreasing at a rate indicative of an incipient skid condition, the control unit acts to interrupt the normal control operation until the skid condition has been corrected, and this corrective action would normally comprise the rapid off/on cycling of the servo valve under the control of the unit 12, thereby releasing and applying the brakes successively in known manner. The operation of the system in its various modes will be described in more detail in connection with the practical arrangement shown in FIG. 2.

Figure 2:
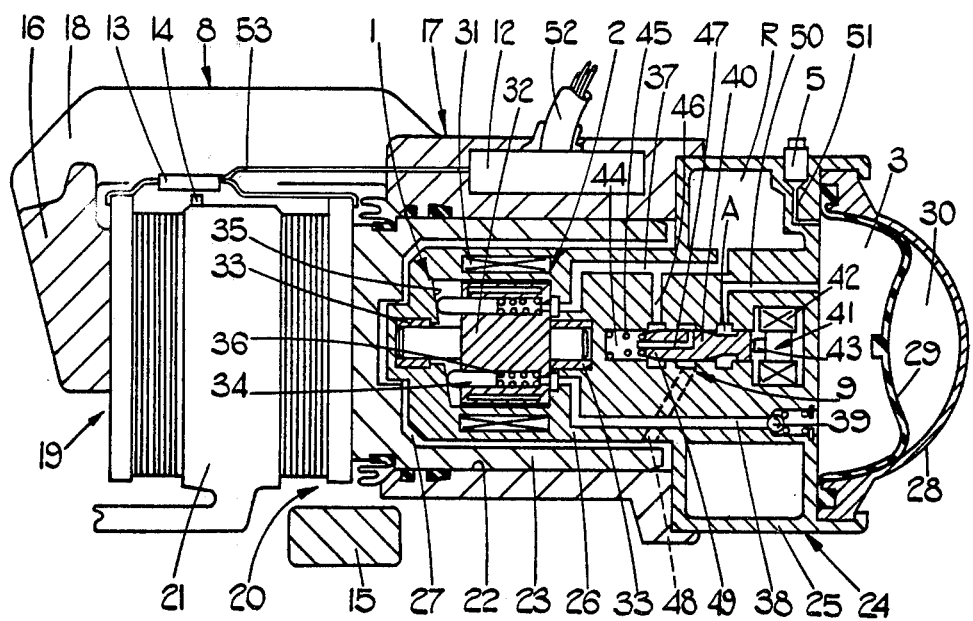
FIG. 2 is a side elevational view, partly in longitudinal cross-section, of one embodiment of the vehicle brake actuator of the invention in the form of a disc brake caliper.

FIG. 2 shows a brake actuator 8 in the form of a disc brake caliper incorporating various components of the braking system of FIG. 1 and which are indicated, where appropriate, by the same reference numerals as those used in FIG. 1. The caliper illustrated is of the reaction type and is slidably mounted on a support, such as a bracket represented at 15, by way of suitable mounting means such as conventional pin assemblies (not shown). The caliper includes a pair of limbs 16 and 17 interconnected by a bridge 18 and a pair of pad assemblies 19 and 20 are mounted in opposed relationship between the limbs at either side of a brake disc 21 and guided and located in the caliper in conventional manner. The limb 17 of the caliper is formed with a hydraulic cylinder 22 containing a piston 23 slidably mounted therein and displaceble under the action of fluid pressure within the cylinder to move and pad assembly 20 into braking engagement with one side of the disc 21. As a result of the reaction occurring upon engagement of the pad assembly 20 with the disc, the caliper is caused to slide with respect to the bracket 15 and thereby moves the pad assembly 19 into braking engagement with the opposite side of the disc.

Part of the caliper is formed as a sub-assembly 24 attached to the limb 17 and consisting of a relatively large diameter portion 25 forming the annular fluid reservoir R, and a hollow portion 26 of relatively small diameter projecting from one end of the portion 25 to be received within the hollow piston 23. A pressure chamber 27 is formed between the internal surface of the piston 23 and the external surface of the projection 26. Mounted on the other end of the sub-assembly portion 25 is a housing 28 of the pressure accumulator 3, the latter being defined between the portion 25 and a flexible diaphragm 29, which latter in conjunction with the housing 28 also defines a gas spring 30 loading the accumulator in conventional manner.

The sub-assembly 24 contains the electric motor 2 and the pump 1 driven thereby for charging the accumulator 3 from the reservoir R. The electric motor includes a stator winding 31 fixed within the sub-assembly 24 and an armature 32 mounted for rotation in bearings 33 fixed in the sub-assembly. The armature carries a plurality of axial pistons 34 which bear against an inclined internal end surface 35 of the sub-assembly 24 and are slidingly reciprocated, upon rotation of the armature 32, against the opposition of springs 36, in the manner of a swashplate pump. The pump is connected at its inlet side by a passage 37 to the reservoir R and at its outlet side by a passage 38 and non-return valve 39 to the accumulator 3. The pump incorporates conventional porting to enable fluid to be induced from the passage 37 and expelled through the passage 38.

Also housed within the sub-assembly 24 is the servo valve 9 which controls the flow of fluid from the accumulator 3 to the brake pressure chamber 27 and includes a spool 40 and an actuating solenoid 41. The solenoid winding is represented at 42 and the armature at 43. The spool is slidable within a bore 44 and is urged towards the armature by a return spring 45. With the valve spool in the position shown, which is the brake inoperative position, the brake pressure chamber 27 is connected to the reservoir R via a passage 46, bore 44, an axial passage 47 of the spool and a passage 48, a tapered nose portion 49 of the spool permitting fluid flow from the passage 46 into the bore 44. A passage 50 between the accumulator 3 and bore 44 is prevented by the spool from communicating with the passage 48 and thus with the brake cylinder 27.

The pressure switch 5 preventing over-charging of the accumulator is mounted on the portion 25 of the sub-assembly 24 and communicates with the accumulator via a passage 51. Additional means may be provided to indicate insufficient accumulator pressure and this may conveniently be embodied in the switch 5. Such additional means may be arranged so that actuation thereof by the occurrence of insufficient pressure renders the wheel slide protection part of the system inoperative. The control unit 12 is housed within the limb 17 of the caliper and connected by wiring 52 to the transducer 10 and to an electrical power supply of the vehicle, and by a lead 53 to the sensor 13 of the wheel speed sensor located at the bridge 8. The toothed formation 14 is carried by the disc 21 either formed integrally therewith or on a separate member secured to the disc. The formation could alternatively be formed on the wheel hub or on a separate member, such as a ring, secured to the latter.

With the solenoid 41 de-energised, the spool 40 assumes the position shown under the action of the spring 45, the brake cylinder 27 being thereby connected to the reservoir R and the accumulator 3 being isolated from the brake, as described above. When the pedal 11 is operated to actuate the brake, the solenoid coil is energised to move the armature 43 to the left, as seen in FIG. 2, which in turn moves the spool 40 leftwards from the position shown to a position in which communication between the passage 46 and the bore 44 is interrupted so that the brake cylinder 27 is no longer connected to the reservoir R. Movement of the spool to this position brings the passage 50 into communication with the passage 48, thereby connecting the accumulator 3 with the brake cylinder 27, causing the piston to actuate the pad assemblies 19 and 20 in order to apply a braking force to the disc 21. The spool is arranged so that the brake cylinder is fully cut off from the reservoir R before the accumulator pressure is applied to the brake cylinder.

The force applied to the spool by the armature depends upon the current supplied to the solenoid winding 42 under the control of the transducer 10 which is in turn governed by an operational parameter of the pedal, such as the distance through which it is depressed or the pressure applied thereto by the driver. The force applied to the armature is opposed by the spring 45 and also by the braking pressure within the brake cylinder 27, since the passage 47 always remains in communication with the passage 48, thereby supplying the braking pressure to the bore 44 at that side of the spool 40 engaged by the spring. The combined forces of the spring and braking pressure on the spool tend to return the spool to the right until these forces balance the electromagnetic force actuating the armature 43 during displacement of the brake pedal. When the state of balance is reached, the spool will have returned sufficiently far to the right to isolate the accumulator from the brake cylinder. Should increased braking force be required, increased pressure on the brake pedal produces an increased electromagnetic force in the solenoid which again moves the spool to the left, once more connecting the accumulator to the brake cylinder until the balanced state is re-established. Upon release of the brake pedal, the electromagnetic force ceases, enabling the spool to return to its original position as shown and thus allowing the pressure in the brake actuator to decay to the reservoir R, thereby releasing the brake.

The control unit 12 receives an output proportional to wheel speed from the wheel speed sensor 13. This output is differentiated in the control unit to produce a signal representative of wheel deceleration and this signal is compared in the control unit with a signal representative of a maximum permissible deceleration value, beyond which excess wheel slip is assumed to occur. When the wheel deceleration exceeds this maximum value during braking, the control unit 12 actuates the solenoid to isolate the accumulator temporarily from the brake cylinder and connect the latter to the reservoir R, in order to release the brake until the control unit senses that the skid condition has been corrected, whereupon the brake is re-applied. In practice, the brake would normally be subjected to rapid off/on cycling, being thereby released and applied successively in known manner.

Figure 3:
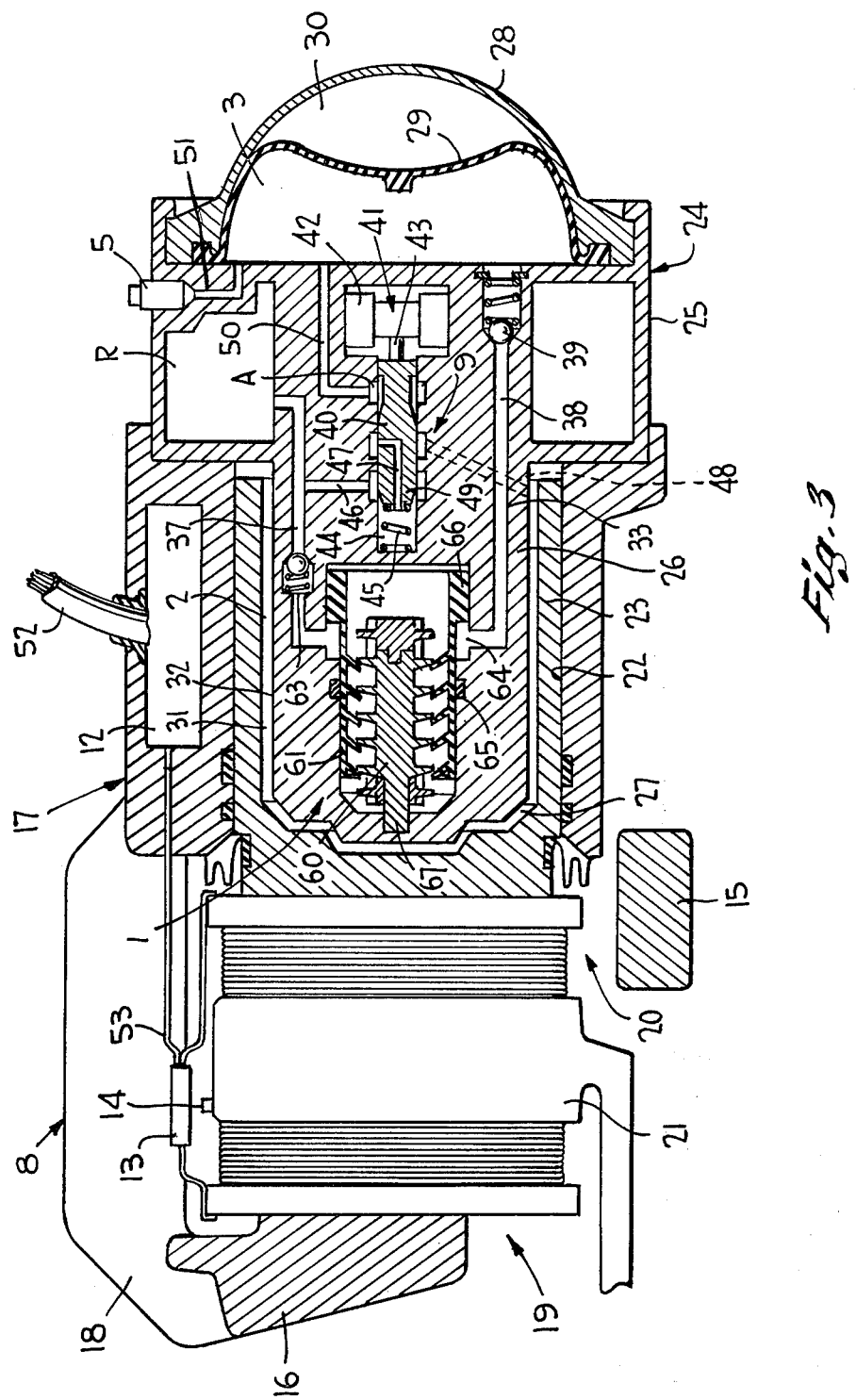
FIG. 3 is a view similar to FIG. 2 but showing an alternative embodiment using a solenoid pump.

The rotary pump 1 and electric motor 2 may be replaced by a reciprocatory pump shown in FIG. 3 operated by an electrical solenoid 60 and armature 61 device, such as a device commonly known as a "Helenoid" for example, of which various forms are described in our U.S. Pat. No. 4,003,013 and the SAE publication, "HELENOID Actuators-A New Concept In Extremely Fast Acting Solenoids" by A. H. Seilly, SAE Technical Paper Series, 790119, Society of Automotive Engineers, Inc., Warrendale. Pa., 1979. The outlet valve in passage 38 is shown at 39 and an inlet valve 63, similar to valve 39, is provided in passage 37. The passages 37, 38 are connected to the cylinder chamber 64 in pump body 1. The armature 61 functions as the piston which is reciprocated by the solenoid in cylinder chamber 64 which is attached at its end 67 to the pump body. Piston seal 66 is provided and seal 65 may be provided to prevent fluid leaking from the cylinder chamber to the solenoid. Reciprocation of the armature-piston 61 draws fluid into the cylinder chamber through the inlet valve and expels it through the outlet valve. In a further alternative arrangement, the pump may be driven from the vehicle wheel to be braked and an unloader valve may then be used to by-pass fluid to the reservoir when the accumulator is charged to the required pressure. It would also be possible to use a common control unit for a number of actuators rather than providing a separate control unit for each actuator, as in the embodiment illustrated.

It will be seen that the entire braking system represented by FIG. 1 (with the exception of the brake pedal 11, associated transducer 10 and the toothed formation of the wheel speed sensor) is contained within the brake actuator 8 in the form of the brake caliper of FIG. 2.

The actuating fluid for the system is contained within the reservoir R and requires no connection to an outside source. Thus, the only connection between the brake actuator and other parts of the vehicle is the wiring 35 which can readily be run to a desired location and this greatly facilitates assembly of the system into a vehicle, and also makes the system particularly advantageous for use on trailers for example. Moreover, the system of the invention obviates the necessity for housing various bulky items of braking equipment in the engine compartment. A further advantage of this system is that each brake actuator constitutes an independent braking system for each wheel. The incorporation of the major system components in a detachable sub-assembly enables repair of the actuator to be carried out rapidly by detachment and possible replacement thereof.

I claim:

1. A vehicle brake actuator for urging at least one friction element into braking engagement with a cooperating element fixed to a member to be braked comprising pressure-applying means including a pressure cylinder and a piston slidable within the cylinder and operably associated with at least one said friction element to urge at least one said friction element into braking engagement with said cooperating element, a pressure accumulator, a supply of pressure fluid, a pump positioned within said cylinder operably connected to said supply of pressure fluid and said accumulator to charge the accumulator with said pressure fluid, valve means operably connected to said supply of pressure fluid and said accumulator to control the supply of pressure fluid from said accumulator to said pressure-applying means, brake control means, and an electrically-operated solenoid operably connected to said valve means and said brake control means to operate said valve means to control said pressure fluid supply in response to the action of said brake control means.

2. An actuator according to claim 1, and further comprising drive means for driving said pump positioned within said cylinder.

3. An actuator according to claim 2, wherein at least the accumulator, pump drive means and valve means are housed in a detachable separate sub-assembly.

4. An actuator according to claim 3, wherein a portion of said sub-assembly contains said pump and drive means and is housed within the piston.

5. An actuator according to claim 2, wherein said pump is of the reciprocatory type and said pump drive means is an electrical solenoid and armature device.

6. An actuator according to claim 1 wherein said piston is of hollow cylindrical form and at least one of said pump and said drive means therefor is housed within said piston.

7. An actuator according to claim 1, and further comprising a fluid reservoir for containing said pressure fluid positioned radially outwardly of the pump.

8. An actuator according to claim 7, wherein said fluid reservoir is of annular form and at least partially surrounds said valve means.

9. An actuator according to claim 7, wherein said valve means comprises a spool valve of which the spool is movable by the solenoid between a first position in which the spool places said reservoir in communication with the pressure-applying means and isolates the accumulator from the pressure-applying means, and a second position in which it places the accumulator in communication with the pressure-applying means and isolates the reservoir from the pressure-applying means.

10. An actuator according to claim 9, wherein the spool is so arranged that, when in its second position, it is subject to the braking pressure which creates a force urging the spool towards its first position against the electro-magnetic force of the solenoid so that a balancing of said forces results in isolation of the accumulator from the pressure-applying means.

11. An actuator according to claim 10, wherein said pump is in permanent communication with the reservoir and the accumulator and further comprising a switch responsive to accumulator pressure for controlling said pump.

12. An actuator according to claim 1 wherein said pump comprises a rotary piston pump.

13. An actuator according to claim 1 wherein said pump comprises an electrically driven pump.

14. An actuator according to claim 1, and further comprising a control unit for said valve means.

15. An actuator according to claim 14, and further comprising means for detecting an incipient skid condition of the braked wheel and operating in conjunction with said control unit to actuate said valve means in a manner to correct the skid.

16. An actuator according to claim 1 wherein the vehicle brake is in the form of a disc brake caliper.

17. A vehicle braking system incorporating at least one brake actuator according to claim 1 and further comprising means producing an electrical output in response to displacement of said brake control means, said output being supplied to said solenoid for actuation of the valve means and thereby the pressure-applying means.

18. A vehicle braking system according to claim 17, wherein said output-producing means comprises a transducer connected mechanically to said brake control means and electrically to said solenoid.

* * * * *